US006603520B2

(12) United States Patent
Umemoto et al.

(10) Patent No.: US 6,603,520 B2
(45) Date of Patent: Aug. 5, 2003

(54) OPTICAL FILM AND LIQUID-CRYSTAL DISPLAY DEVICE

(75) Inventors: Seiji Umemoto, Osaka (JP); Toshihiko Ariyoshi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 46 days.

(21) Appl. No.: 10/024,551

(22) Filed: Dec. 21, 2001

(65) Prior Publication Data

US 2002/0080308 A1 Jun. 27, 2002

(30) Foreign Application Priority Data

Dec. 21, 2000 (JP) ........................................ 2000-388627

(51) Int. Cl.[7] ............................................ G02F 1/1335
(52) U.S. Cl. ............................. 349/65; 349/61; 349/62; 349/63; 349/64; 362/31
(58) Field of Search ......................... 349/61–65; 362/31

(56) References Cited

U.S. PATENT DOCUMENTS 5,461,547 A * 10/1995 Ciupke et al. ................ 349/64
5,775,791 A * 7/1998 Yoshikawa et al. ........... 362/31
6,375,336 B1 * 4/2002 Suzuki et al. ................. 349/65

* cited by examiner

Primary Examiner—Julie Ngo
(74) Attorney, Agent, or Firm—Sughrue Mion, PLLC (57) ABSTRACT

An optical film is constituted by a transparent film with a refractive index of not lower than 1.49. The transparent film including light exit means which are constituted by concave or convex portions and which are arranged partially like pits in one of opposite surfaces of the transparent film so as to face at least one virtual center formed in one place located on or outside a layer thickness surface at an end of the transparent film, each concave or convex portion having a length of not larger than 200 $\mu$m and a depth or height of not larger than 50 $\mu$m, each of the light exit means having an optical path changing slope inclined to the film surface of the transparent film at an inclination angle in a range of from 35 to 48 degrees, and an elevational face inclined to the film surface at an inclination angle of not lower than 50 degrees. A liquid-crystal display device is constituted by a liquid-crystal display panel and the optical film, the optical film being disposed on one of opposite surfaces of the liquid-crystal display panel so that a surface of the optical film in which the light exit means are provided is located outward.

14 Claims, 4 Drawing Sheets

OPTICAL FILM AND LIQUID-CRYSTAL DISPLAY DEVICE

The present application is based on Japanese Patent Application No. 2000-388627, which is incorporated herein by reference.

BACKGROUND OF THE INVENTION

1. Field of the Invention

The present invention relates to an optical film which changes the optical path of light incident on a side surface of a liquid-crystal panel into a viewing direction efficiently so that the optical film can be used to form an external light-illumination double mode reflective or transmissible liquid-crystal display device which is thin in thickness and light in weight, and display of which is bright, excellent in uniformity of brightness and easy to view.

2. Description of the Related Art

A liquid-crystal display device smaller in thickness and weight is demanded for the purposes of: suppression of increase in weight of a television set or a personal computer screen because of increase in size thereof; reduction in size and weight of a portable personal computer, a cellular phone, or the like; and so on. For a background-art liquid-crystal display device in which a backlight or a front light using a side light pipe is provided, however, it has been already difficult to reduce the thickness and weight of the liquid-crystal display device any more. It is because a plate thickness is required to be not smaller than 1 mm for light transmission, a light-diffusing plate, a prism sheet, a half mirror, or the like, is required to be disposed to control the optical path and quantity of light, so that a thickness of not smaller than 3 mm is generally required for the background-art liquid-crystal display device. A light pipe including stripe-like light exit means has been proposed. In such a light pipe, however, moire was apt to occur because of interference of the stripe-like light exit means with pixels of a liquid-crystal display panel due to stripe-like light emission. There was therefore a problem that a light-diffusing plate, a prism sheet, or the like, was required for preventing moire. Moreover, such a light pipe needs a linear light source, which is unfavorable for reduction in thickness and weight, so that it was particularly difficult to reduce in thickness and weight of a portable liquid-crystal display device. There was a further disadvantage that a high-grade technique was required for positioning the linear light source relative to the light pipe.

On the other hand, there has been proposed another light pipe in which light exit means constituted by a structure of spherical dots or cylindrical pits in section are provided and light is emitted from a point light source. Because light was reflected by the spherical dots or the cylindrical pits, the reflected light was diffused largely so that the exit light was inclined largely to the normal line (frontal) direction of the light pipe. There was a disadvantage that display was dimmed because the percentage of light entering the liquid-crystal display panel as illumination light was low. There was therefore a problem that a light-diffusing plate, a prism sheet, or the like, was required for eliminating the disadvantage. Accordingly, when an illumination system using a side light pipe is applied to a liquid-crystal display device, thickness and weight of the liquid-crystal display device can be hardly reduced any more than the thickness and weight of an existing liquid-crystal display device because retention members such as a chassis or the like are further required as other constituent members.

SUMMARY OF THE INVENTION

It is an object of the present invention to develop an optical film by which the optical path of light, from the a point light source, incident on a side surface of a liquid-crystal display panel is changed into a viewing direction efficiently so that the optical film can be used to form an external light-illumination double mode reflective or transmissible liquid-crystal display device which is thin in thickness and light in weight, and display of which is bright, excellent in uniformity of brightness and easy to view.

According to the present invention, there is provided an optical film constituted by: a transparent film with a refractive index of not lower than 1.49, the transparent film including light exit means which are constituted by concave or convex portions and which are arranged partially like pits in one of opposite surfaces of the transparent film so as to face at least one virtual center formed in one place located on or outside a layer thickness surface at an end of the transparent film, each concave or convex portion having a length of not larger than 200 $\mu$m and a depth or height of not larger than 50 $\mu$m, each of the light exit means having an optical path changing slope inclined to the film surface of the transparent film at an inclination angle in a range of from 35 to 48 degrees, and an elevational face inclined to the film surface at an inclination angle of not lower than 50 degrees. There is further provided a liquid-crystal display device comprising: a liquid-crystal display panel; and the optical film, the optical film being disposed on one of opposite surfaces of the liquid-crystal display panel so that a surface of the optical film in which the light exit means are provided is located outward.

According to the present invention, a point light source is disposed on a side of the liquid-crystal display panel and on a line containing a virtual center of the light exit means in the optical film to thereby make radiant light enter the panel. Hence, the optical path of the light can be changed, through the optical path changing slopes of the light exit means, into a direction of a surface of the film in which the light exit means are not provided, and with good directivity with respect to the normal line direction of the panel. The optical film can be used in a backlight or a front light to thereby form a transmissible or reflective liquid-crystal display device in which the whole area of the panel display surface can be illuminated uniformly and which is excellent in reduction in thickness and weight and excellent in display quality.

Also in the case where the optical film is disposed on the visual side of the panel to form a front light, external light can be made to enter the optical film efficiently through flat face portions formed between the light exit means partially arranged in the optical film. Hence, liquid-crystal display in an external light mode can be achieved by use of a system in which incident light on a surface of the panel is inverted by a reflection layer disposed in a predetermined position. Hence, an external light-illumination double mode transmissible or reflective liquid-crystal display device as described above can be formed. Moreover, when the arrangement of the light exit means is controlled, the production of moire caused by interference of the light exit means with pixels can be suppressed efficiently. Moreover, the density of arrangement of the optical path changing slopes, or the like, can be adjusted easily, so that the quantity of light transmitted through the optical film in the direction of the thickness of the optical film can be controlled by the area occupied by the light exit means. In addition, the light source can be positioned easily relative to the optical film.

DETAILED DESCRIPTION OF THE PREFERRED EMBODIMENTS

Figure 1A:
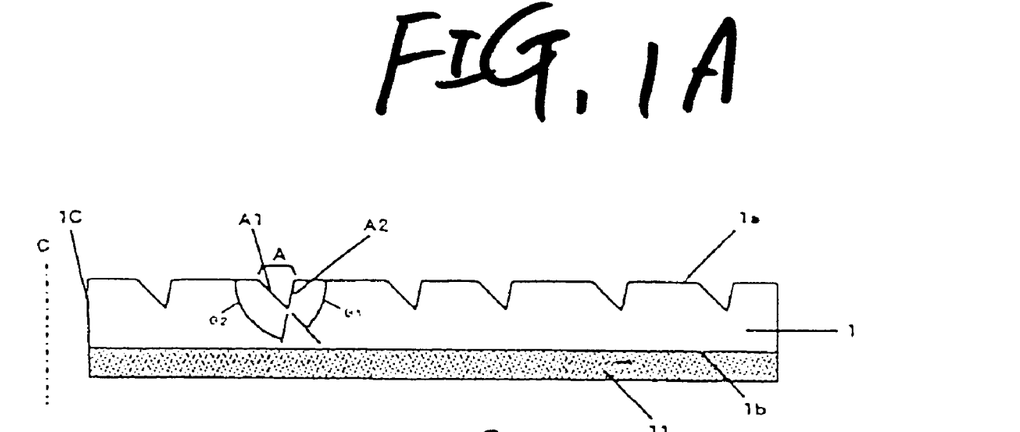
FIGS. 1A and 1B are explanatory side views of examples of an optical film.
Figure 1B:
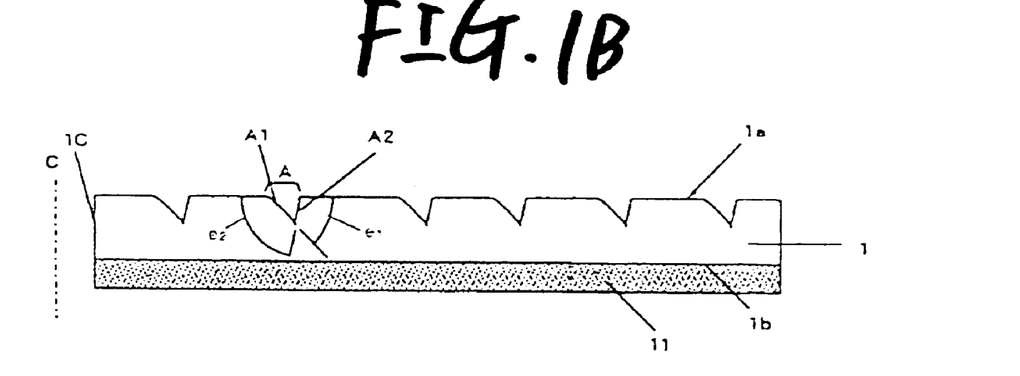

According to the present invention, there is provided an optical film constituted by: a transparent film with a refractive index of not lower than 1.49, the transparent film including light exit means which are constituted by concave or convex portions and which are arranged partially like pits in one of opposite surfaces of the transparent film so as to face at least one virtual center formed in one place located on or outside a layer thickness surface at an end of the transparent film, each concave or convex portion having a length of not larger than 200 μm and a depth or height of not larger than 50 μm, each of the light exit means having an optical path changing slope inclined to the film surface of the transparent film at an inclination angle in a range of from 35 to 48 degrees, and an elevational face inclined to the film surface at an inclination angle of not lower than 50 degrees. FIGS. 1A and 1B show examples of the optical film. An optical film (transparent film) 1 has a surface 1a in which light exit means A are formed, a rear surface 1b which serves as a light exit side, and a layer thickness surface 1c which serves as a light source arrangement side. The reference symbol C designates a virtual center located outside the layer thickness surface 1c.

Figure 4:
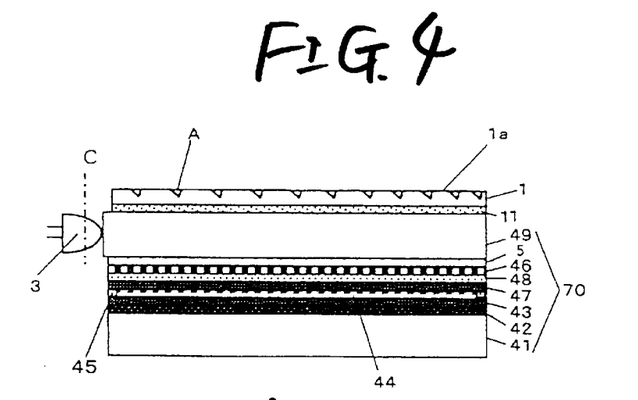
FIG. 4 is an explanatory side view of a liquid-crystal display device.

As shown in FIG. 4 or the like, the optical film 1 is disposed in a direction along a panel plane of a liquid-crystal display panel 70 having a point light source 3 on a side thereof so that the surface 1a in which the light exit means are formed is located outward. Light incident on a side surface from the point light source or transmitted light thereof is reflected through the optical path changing slopes A1. Then, the optical path of the light is changed toward the rear surface side of the transparent film 1 in which the light exit means are not provided, that is, into a viewing direction of the liquid-crystal display panel. Hence, the light is made to exit from the transparent film so that the exit light can be utilized as illumination light (display light) for the liquid-crystal display panel, or the like.

The transparent film with a refractive index of not lower than 1.49 can be formed from one or two or more kinds of suitable materials in accordance with the wave range of light to be made incident on the transparent film from the point light source or the like and exhibiting transparency to the wave range. Incidentally, examples of the materials used in a visible light range include: transparent resin represented by acrylic resin, polycarbonate resin, cellulose resin or norbornene resin; curable resin which can be polymerized by heat or by radial rays such as ultraviolet rays or electron rays; and so on.

From the point of view to enhance the efficiency of light incident on the optical path changing slopes to thereby obtain a liquid-crystal display device bright and excellent in uniformity of brightness, it is preferable that the refractive index of the transparent film is not lower than that of the liquid-crystal display panel, especially not lower than that of a substrate of the panel, specifically not lower than 1.51, more specifically not lower than 1.52. From the point of view to restrain surface reflection in the case where the liquid-crystal display uses a front light, it is preferable that the refractive index is not higher than 1.6, especially not higher than 1.56, more especially not higher than 1.54. Although such a refractive index is generally based on a D line in the case of the visible light range, it is not limited thereto and may be set in accordance with the wave range of incident light if the refractive index has peculiarity to the wave range of the incident light (the same thing will apply hereunder).

From the point of view to restrain luminance unevenness or color shading to thereby obtain a liquid-crystal display device low in display unevenness, it is preferable that the transparent film exhibits no birefringence or small birefringence, and particularly has an average in-plane retardation of not larger than 30 mm. When linearly polarized light is incident on the transparent film through a polarizer, or the like, in the condition that the transparent film is made to have a small retardation, the polarized state of the light can be kept satisfactory advantageously to prevent the display quality from being deteriorated.

From the point of view to prevent display unevenness, it is preferable that the average in-plane retardation of the transparent film is not larger than 20 nm, especially not larger than 15 nm, more especially not larger than 10 nm, and the retardation of the transparent film from place to place varies as narrowly as possible. Further, from the point of view to restrain internal stress easily produced in the transparent film in the bonding process to thereby prevent a retardation from being caused by the internal stress, it is preferable that the transparent film is made of a material having a low photoelastic coefficient.

In addition, from the point of view to prevent display unevenness or the like, it is preferable that the average thicknesswise retardation of the transparent film is not larger than 50 nm, especially not larger than 30 nm, more especially not larger than 20 nm. Such a small retardation transparent film maybe formed by a suitable system, for example, by a system in which internal optical strain is eliminated by an existing system of annealing a film. The preferred system is a system in which a transparent film with a small retardation is formed by casting. Incidentally, it is preferable that the aforementioned retardation in the transparent film is based on light in a visible range, particularly on light with a wavelength of 550 nm.

The transparent film is generally formed as a monolayer body but may be formed as a laminate or the like constituted by one kind of material or by different kinds of materials. The thickness of the transparent film can be determined suitably without any limitation. From the point of view to reduce thickness and weight, or the like, it is preferable that the thickness of the transparent film is set to be in a range of from 5 to 500 μm, especially in a range of from 10 to 300 μm, more especially in a range of from 20 to 100 μm. When the thickness is set to be in the aforementioned range, a sizing process can be performed easily by punching or the like.

Figure 2A:
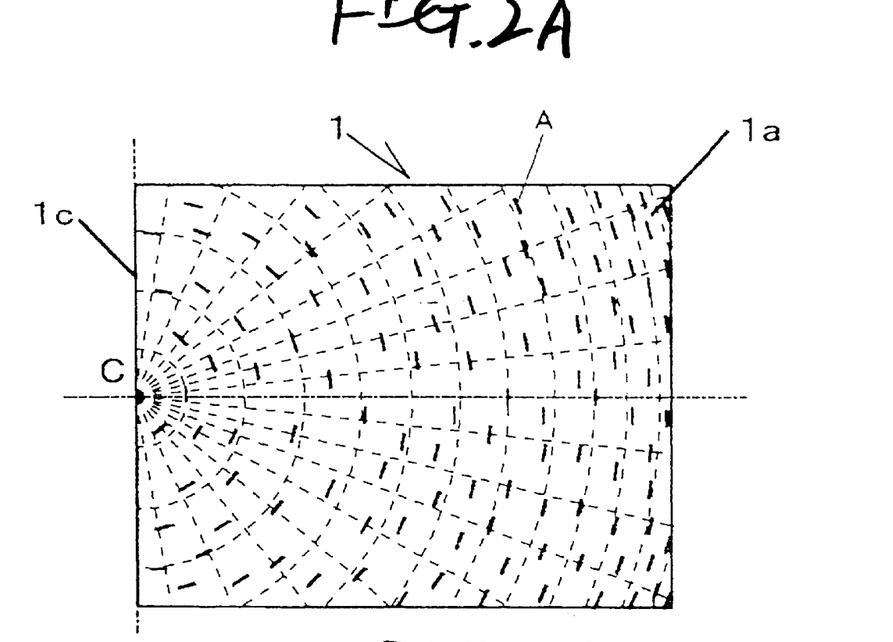
FIGS. 2A and 2B are explanatory plan views of pit-like arrangement of light exit means.
Figure 2B:
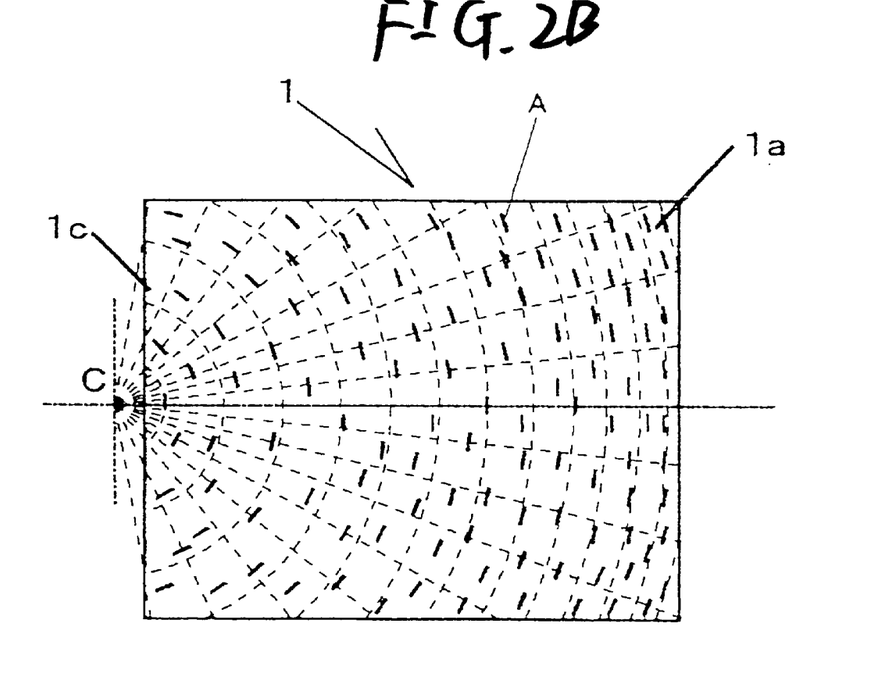

The optical film is formed by providing the light exit means A in one surface of the transparent film so as to obtain the aforementioned exit characteristic. As shown in FIG. 1A or 1B, each of the light exit means A has an optical path changing slope A1 inclined to the film surface at an inclination angle θ1 in a range of from 35 to 48 degrees, and an elevational face A2 inclined to the film surface at an inclination angle θ2 of not lower than 50 degrees. Further, the light exit means A are constituted by concave or convex portions partially arranged like pits so as to face at least one virtual center C located on the layer thickness surface 1c (FIG. 2A) or outside the layer thickness surface 1c (FIG. 2B) at an end of the film as shown in FIG. 2A or 2B. Each of the concave or convex portions is made to have a length of not larger than 200 μm and a depth or height of not larger than 50 μm.

In the above description, the optical path of radiant light incident on a side surface from the point light source disposed on a side surface of the liquid-crystal display panel, or the like, or the optical path of transmitted light thereof is changed to the rear surface 1b side of the transparent film through the optical path changing slopes A1, so that light excellent in directivity in the normal line direction with respect to the liquid-crystal display panel or the like can be made to exit from the transparent film with good efficiency of utilization of light emitted from the light source. Incidentally, the aforementioned concave or convex portions are based on whether the light exit means are depressed (as grooves) in the optical film or protruded (as mountains) from the optical film with respect to the surface in which the light exit means are formed. The length of each of the concave or convex portions is based on the continuous direction of the grooves in the concave portions or of the maintains in the convex portions. The depth or height of each of the concave or convex portions is determined by reference to the surface of the transparent film in which the light exit means are formed.

As described above, the optical path changing slopes A1 play a role in reflecting incident light from the point light source in an illumination mode to thereby change the optical path of the light into the direction of the rear surface of the transparent film. When the optical path changing slopes are arranged like pits so that the direction of the length of the optical path changing slopes faces the virtual center C as perpendicularly as possible, as shown in each of FIGS. 2A and 2B, light from the point light source can be changed into light of a planar light source without necessity of any means such as a linear light pipe for changing the light of the point light source into light of a linear light source. Hence, light emission can be performed efficiently without any light loss due to the linear light pipe or the like.

That is, the point light source is provided so that light radiated from the point light source diverges and enters the liquid-crystal display panel or the like. Hence, the light is transmitted while the radiation characteristic is retained. As a result, the light is incident on the optical film. Therefore, when the direction of the length of the optical path changing slopes is disposed as perpendicular to the virtual center as possible upon the fictitious assumption that the center of the radiant light incident on the optical film is regarded as the virtual center of the light exit means, the optical path of the radiant light can be changed into the direction of the rear surface efficiently.

In the above description, from the point of view to reflect light by the optical path changing slopes and made the light exit from the rear surface of the transparent film with good directivity in the normal line direction of the film surface to improve illumination efficiency of the liquid-crystal display panel to thereby achieve liquid-crystal display which is bright and which is easy to view, it is preferable that the inclination angle θ1 of each of the optical path changing slopes to the film surface is in a range of from 35 to 48 degrees, especially in a range of from 38 to 45 degrees, more especially in a range of from 40 to 43 degrees. Incidentally, it is preferable from the point of view of incidence efficiency that the optical path changing slopes face the virtual center located on or outside the layer thickness surface on a side where the point light source is disposed. Therefore, also when the light exit means are constituted either by concave portions or by convex portions, it is preferable that the optical path changing slopes are formed as slopes inclined downward from the layer thickness surface 1c side where the light source is disposed to the opposite end side as shown in FIG. 1A or 1B. The configuration of the optical path changing slopes is, however, not limited thereto.

On the other hand, the elevational faces A2 opposite to the optical path changing slopes A1 respectively do not contribute to exit of light incident on the side surface from the rear surface. It is preferable that the influence of the elevational faces A2 on display quality, light transmission and light exit is as little as possible. Incidentally, if the inclination angle θ2 of each of the elevational faces to the film surface were too small, the projected area of the elevational faces on the film surface would become so large that light surface-reflected by the elevational faces would be apt to be fed back to the direction of observation to thereby disturb display quality in an external light mode in the case where the optical film is disposed as a front light.

Accordingly, the display quality is improved advantageously as the inclination angle θ2 of each of the elevational faces increases. Hence, the projected area of the elevational faces on the film surface can be reduced and the vertical angle between the optical path changing slope and the elevational face can be reduced. Hence, surface-reflected light can be reduced and the reflected light can be inclined toward the direction of the plane of the optical film (the direction of the film surface). Hence, the influence on liquid-crystal display can be suppressed. From this point of view, the preferred inclination angle θ2 of each of the elevational faces is not smaller than 55 degrees, especially not smaller than 60 degrees, more especially not smaller than 75 degrees. Although the ideal value of the inclination angle θ2 from the aforementioned point of view is 90 degrees, this value is undesirable from the point of view of efficiency in production of the optical film because the elevational faces each having this value as the inclination angle can be hardly formed by a shape transfer system using a mold, or the like.

The discontinuous and intermittent partial arrangement of the light exit means A as shown in FIGS. 2A and 2B is performed for achieving the pit-like arrangement advantageously. The reduction in size of the light exit means is performed for restraining vision and restraining image disorder caused by the vision to thereby attain improvement of display quality. If the size were too large, the controllability of the arrangement density would be lowered. If the arrangement density were too low, illumination for pixels would become so uneven that light emission would be apt to vary largely. As a result, the light exit means would appear as light-emitting points so that display quality would be apt to deteriorate.

From-the point of view of suppression of vision, controllability of arrangement density as to the number of arranged light exit means, or the like, it is preferable that each of the light exit means has a size with a length of not larger than 150 μm, especially not larger than 100 μm, more especially not larger than 80 μm, a depth or height of not larger than 40 μm, especially not larger than 20 μm, more especially not larger 10 μm, and a length/(depth or height) ratio of not lower than 3, especially not lower than 5, more especially not lower than 10. On the other hand, if the size of each of the light exit means were too small, reflected light could be hardly formed because diffraction would hold a dominant position, and the optical film could be hardly produced because the number of arranged light exit means was increased. From this point of view, it is preferable that each of the light exit means has a size with a length of not smaller than 10 μm and a depth or height of not smaller than 2 μm.

The shape or the like for each of the intermittent ends of the concave or convex portions forming the light exit means is not particularly limited. From the point of view to suppress the influence due to reduction of light incident on the concave or convex portions, it is preferable that the intermittent ends are formed as slopes inclined at an angle of not smaller than 30 degrees, especially not smaller than 45 degrees, more especially not smaller than 60 degrees. Incidentally, from the point of view to prevent damage, incidence efficiency of light, or the like, the shape of concave portions is preferred to the shape of convex portions. Further, light exit means A constituted by concave or convex portions each-shaped substantially like a scalene triangle in section as shown in each of FIGS. 1A and 1B are preferred from the point of view of controllability of exit characteristic, facilitation of formation of the light exit means, or the like.

The pit-like arrangement of the light exit means is provided so that light is emitted from the rear surface of the optical film as uniformly as possible in the aforementioned arrangement of the point light source. Hence, as shown in FIG. 2A or 2B, the pit-like arrangement is performed so that a virtual center C is formed on the layer thickness surface 1c (FIG. 2A) or outside the layer thickness surface 1c (FIG. 2B) at an end of the transparent film to thereby make it possible to dispose the point light source easily, and so that the optical path changing slopes face the virtual center. In this case, one or two or more layer thickness surfaces of the transparent film can be provided as a place or places where a light source or sources are arranged.

Hence, one or two or more virtual centers may be formed in one place or in two or more different places with respect to one-layer thickness surface or different layer thickness surfaces. When one virtual center is formed on one layer thickness surface, it is preferable that the virtual center is formed in the approximate center of the layer thickness surface, and when a plurality of virtual centers are formed on one layer thickness layer, it is preferable that the plurality of virtual centers are formed symmetrically about the approximate center of the layer thickness surface, from the point of view to achieve uniform light emission from the rear surface. Incidentally, when the characteristic of uniform light emission is to be destroyed on purpose so as to give a partial difference between brightness and darkness to light emission, for example, so as to make one portion bright, the virtual centers may be disposed asymmetrically to control the difference between brightness and darkness. Also when different layer thickness surfaces are provided as places where light sources are arranged, such virtual centers need not be provided in the respective approximate centers of the layer thickness surfaces but suitable positions can be provided as the virtual centers in accordance with distribution characteristic of luminous intensity such as uniform light emission, occulting light emission, or the like.

The pit-like arrangements based on the partial arrangement of the light exit means may be regular. From the point of view to prevent moire caused by interference of the light exit means with pixels of the liquid-crystal display panel to make forward-travelling light rays from the point light source be incident on the light exit means (optical path changing slopes), or the like, the number of which is as large as possible, it is however preferable that the pit-like arrangements are at random as shown in each of FIGS. 2A and 2B. If the pit-like arrangements of the light exit means overlap one another with respect to forward-travelling light rays from the point light source, the forward-travelling light rays are blocked by the preceding light exit means located nearer to the point light source so that the quantity of light incident on the succeeding light exit means is reduced. Incidentally, in each of FIGS. 2A and 2B, the radiant and concentric dot-lines represented by thin lines are explanatory auxiliary lines for making the arrangement of the light exit means clear.

Hence, as the overlapping area of the light exit means with respect to the forward-travelling light rays increases, the quantity of light incident on the succeeding light exit means decreases so that exit light is apt to be dimmed and so that luminance is apt to vary largely. Hence, in the irregular arrangement in which the light exit means (optical path changing slopes) in the light exit means-forming surface of the transparent film face the virtual center, it is preferable from the point of view of preventing variation in luminance that the light exit means A are denser as they are located farther from the virtual center, as shown in each of FIGS. 2A and 2B. Such dense arrangement is also effective from the point of view to cope with lowering of luminance based on the fact that the intensity of transmitted light decreases as the position becomes far from the point light source. Incidentally, the aforementioned sparseness and denseness depend on the area of the light exit means A. The sparseness and denseness, however, may be based on whether the arrangement density of the light exit means is high or low, or may be based on whether the size of the light exit means is large or small.

On the other hand, in a liquid-crystal display device using a front light, liquid-crystal display is visually recognized through the optical film disposed on the visual side either in a reflection mode or in an illumination mode as described above. If the area occupied by the light exit means in the optical film is too large, visual recognition may be disturbed by the light exit means in the same manner as in the case where the size of the light exit means is too large. Incidentally, as the light exit means overlap pixels of the liquid-crystal display panel, display is apt to be unnatural because the exit of display light is disturbed by slope reflection to thereby bring about shortage of transmission of display light. Therefore, from the point of view of good display quality to prevent such disturbance of visual recognition, it is preferable that the area occupied by the light exit means is reduced so that display light can be sufficiently transmitted through the-other portion of the optical film than the light exit means.

On the other hand, as described above, the light exit means are, however, means for illuminating the liquid-crystal display panel in an illumination mode. Hence, from the point of view to improve luminance, it is preferable that the area occupied by the light exit means is larger. Hence, from the point of view to retain visibility of liquid-crystal display and luminance of liquid-crystal display in an illumination mode, in the aforementioned arrangement of the light exit means, it is desired that the area occupied by the light exit means is balanced. In the present invention, it is preferable from this point of view that the occupied area based on the projected area of the light exit means on the light exit means-forming surface of the transparent film is in a range of from 1/100 to 1/8, especially in a range of from 1/50 to 1/10, more especially in a range of from 1/30 to 1/15. When the occupied area is set in the above-mentioned range, the optical film can be, preferably, formed as an optical film in which light incident on the light exit means-forming surface (or on the rear surface) is transmitted efficiently through the rear surface (or through the light exit means-forming surface) without being influenced by the light exit means.

Incidentally, in the partial arrangement of the light exit means, the interval of the arrangement can be determined suitably in accordance with the balance between visibility and luminance, the area occupied by the light exit means, or the like. In the pit-like arrangement, it is general that the interval of the arrangement is at random. In the case where a liquid-crystal display device using a backlight is formed, particularly in the case where the liquid-crystal display exclusive to an illumination mode is formed, it is advantageous from the point of view to enhance luminance that the occupied area based on the projected area of the light exit means on the light exit means-forming surface of the transparent film is made larger because the problem of visual recognition caused by the optical film in the aforementioned front light does not occur. In this case, the occupied area can be also set not to be larger than 1/8, especially in a range of from 1/1.1 to 1/6, more especially in a range from 1/2 to 1/3.

The transparent film having the optical path changing means can be formed by a suitable method such as: a method in which a thermoplastic resin is pressed against a mold capable of forming a predetermined shape under heating to thereby transfer the shape; a method in which a mold capable of forming a predetermined shape is filled with a hot-melted thermoplastic resin or a resin fluidized by heat or through a solvent; a method in which a fluid resin polymerizable by heat or by radial rays such as ultraviolet rays or electron rays is polymerized in the condition that the fluid resin is cast in a mold capable of forming a predetermined shape or in the condition that the mold is filled with the fluid resin; or the like. The above-mentioned methods are particularly useful for a transparent film which is formed integrally to have optical path changing means so that the transparent film and the structural layer of the optical path changing means are provided as one body.

A preferred method for forming the transparent film having the optical path changing means is a method in which light exit means having optical path changing slopes are given to one surface of the transparent film through a mold having a predetermined prismatic structure. Examples of the method include: a method in which one side of a transparent film is coated with a curable resin polymerizable by ultraviolet rays, radial rays or the like, the coating layer is cured by irradiation with ultraviolet rays, radial rays or the like while being brought into close contact with the surface of the mold in which the predetermined prismatic structure has been formed, and the transparent film obtained thus is peeled off and collected from the mold; and a method in which such a curable resin is poured on the surface of the mold in which the predetermined prismatic structure has been formed, a transparent film is disposed tightly on the resin layer, the resin layer is cured by irradiation with ultraviolet rays, radial rays or the like, and the transparent film obtained thus is peeled off and collected from the mold. Thus, in this case, a structural layer of optical path changing means provided separately from the transparent film is formed on the transparent film.

In the latter of the above-mentioned methods, in which the optical path changing means are added to the transparent film, light exit efficiency may be reduced largely because of interface reflection or the like if there is a large refractive index difference between the structural layer of the added optical path changing means and the transparent film. From the point of view to prevent the reduction of the light exit efficiency, it is preferable that the refractive index difference between the transparent film and the structural layer of the optical path changing means is made as low as possible, especially to be not larger than 0.10, more especially to be not larger than 0.05. In addition, in this case, it is preferable that the refractive index of the structural layer of the added optical path changing means is made higher than that of the transparent film from the point of view of the light exit efficiency. Incidentally, a suitable transparent material in accordance with the wave range of incident light may be used to form the structural layer of the optical path changing means, similarly to the case for the transparent film.

Incidentally, the light exit means-forming surface, particularly the optical path changing slopes A1 and elevational faces A2, can be formed into a suitable surface shape such as a linear surface or a bent surface as shown in FIG. 1A or a curved surface as shown in FIG. 1B. Further, the light exit means can be formed so that different shapes or the like are used in combination in addition to different arrangement pitches. From the point of view to facilitate attachment of the optical film to the liquid-crystal display panel or the like, formability of the optical film, prevention of disorder of a display image, or the like, it is preferable that the front and rear surfaces of the optical film excluding the portion of the light exit means are flat surfaces as smooth as possible.

As shown in each of FIGS. 1A and 1B, the optical film can be provided to have an adhesive means 11 on the surface of the transparent film 1 in which the light exit means are not provided. Such an adhesive means is provided to bond the optical film to a support member such as a liquid-crystal display panel or the like. A bonding process using the adhesive means is provided for the purposes of: improvement of reflection efficiency by the optical path changing slopes A1 of the optical path changing means A; hence improvement of luminance due to effective utilization of light incident on the side surface; and so on. It is preferable from this point of view that the adhesive means is set to have a refractive index of not lower than 1.49. From the point of view to restrain total reflection in the bonding interface between the optical film and the liquid-crystal display panel or the like to thereby enhance the efficiency of panel-transmitted light incident on the optical film to thereby obtain a liquid-crystal display device in which display is bright and superior in uniformity of brightness, the preferred refractive index of the adhesive means is not lower than 1.50, especially not lower than 1.51, more especially not lower than 1.52.

Incidentally, a resin plate or an optical glass plate is usually used for the panel substrate of the liquid-crystal display panel. In the case of a non-alkali glass plate, the refractive index of which is generally in a range of about 1.51 to about 1.52, the bonding process is performed ideally through the adhesive means having a higher refractive index than the above-mentioned range. Thus, most of transmitted light with an angle large enough to be incident on the optical film from the panel can be made to enter the optical film without being totally reflected on the bonding interface. From the point of view to restrain the quantity of light loss which cannot be made to exit because of the confinement effect based on total reflection, and hence to improve display luminance, in-plane uniformity of brightness, or the like, the preferred refractive index difference in each of interfaces among light-transmissible optical layers such as the adhesive means, the liquid-crystal display panel, the transparent film, and so on, is not larger than 0.15, especially not larger than 0.10, more especially not larger than 0.05.

If the refractive index of the adhesive means were too high, there would be apt to arise problems such as: increase in interface reflection loss caused by the refractive index difference, particularly increase in reflectivity of transmitted light which is substantially parallel with the panel; increase in optical absorption, particularly increase in absorption of short-wave side light in a visible light; coloring caused by chromatic dispersion, particularly increase in yellow degree in the case of an ultraviolet-curable resin; deterioration in bonding characteristic of the adhesive layer or production of optical absorption; and so on. It is therefore preferable that the adhesive means is set to have a refractive index of not higher than 1.6, especially not higher than 1.55, more especially not higher than 1.53.

As the adhesive means, it is possible to use a suitable one satisfying the aforementioned refractive index, such as an adhesive agent cured by irradiation with ultraviolet rays, radial rays, or the like, or by heating, without any special limitation. From the point of view of handling properties such as simple adhesion properties or the like, stress relaxation ability to restrain internal stress from being generated, and so on, an adhesive layer may be used preferably. The adhesive layer is preferably formed of a tackiness agent, or the like, using a suitable polymer as a base polymer. Examples of the base polymer include rubber, acrylic, vinyl alkyl ether, silicon, polyester, polyurethane, polyether, polyamide, styrene, etc. Especially, it is preferable to use a tackiness agent superior in transparency, weather resistance, heat resistance, and so on, such as an acrylic tackiness agent using, as a base polymer, a polymer mainly containing acrylic or methacrylic alkyl ester.

In addition, the adhesive means may be arranged to contain one kind or two or more kinds of suitable transparent particles selected from inorganic particles, which may be conductive, such as silica, alumina, titania, zirconia, tin oxide, indium oxide, cadmium oxide or antimony oxide, or selected from organic particles such as crosslinked or non-crosslinked polymer or the like. In this case, the adhesive means can be formed to be of a light diffusing type. Incidentally, in order to prevent the adhesive means from being contaminated with foreign matters, it is preferable that the adhesive means is temporarily covered with a peel sheet until the adhesive means is put into practical use.

On the other hand, if necessary, the light exit means-forming surface of the optical film may be subjected to non-glare treatment or anti-reflection treatment for preventing visual recognition from being disturbed by surface reflection of external light or subjected to hard coat treatment for preventing the optical film from being damaged. The optical film subjected to such treatment can be used particularly in a front light. Non-glare treatment can be made to form the surface as a fine prismatic structure by any one of various systems. Examples of the systems include: a surface roughening system such as a sandblasting system, an embossing system, etc.; a coating system for mixing transparent particles such as silica particles with a resin; and so on. Anti-reflection treatment can be made by a system of forming a coherent vapor-deposited film, or the like. Hard coat treatment can be made by a system for applying a hard resin such as a curable resin.

For attachment of the non-glare layer or the like, it is preferable from the point of view to retain the function of the light exit means that the optical film is processed so that the portion of the light exit means is not subjected to the non-glare treatment. Therefore, the non-glare treatment, the anti-reflection treatment or the hard coat treatment may be performed by a system in which a film or films subjected to one kind or two or more kinds of treatments out of the treatments are bonded to the optical film. Also in this case, treatment or treatments are preferably made so that particularly the light exit means constituted by concave portions are not buried in the adhesive agent or the like. Hence, a vacuum evaporation system or the like is useful for direct attachment of the anti-reflection layer.

The light exit means are, however, allowed to be buried in an adhesive agent, or the like, having a low refractive index to produce a refractive index difference sufficient to cause interface reflection, especially a refractive index difference of not higher than 0.02, more especially a refractive index difference not higher than 0.05 because the lowering of the function of the light exit means is small. It is preferable from this point of view that an adhesive agent with a refractive index of not higher than 1.47 is used for the bonding process. Incidentally, a film substrate or the like other than the above description may be provided on the light exit means-forming surface in order to protect the light exit means-forming surface. Also in this case, it is preferable that the film substrate or the like is attached under a condition that the film substrate gives no influence on the light exit means for the aforementioned reason.

Figure 3A:
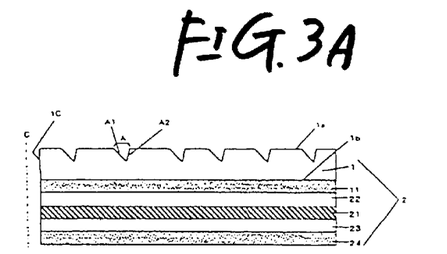
FIGS. 3A and 3B are explanatory side views of other examples of the optical film.
Figure 3B:
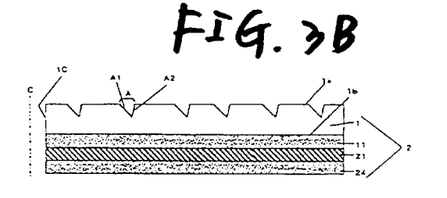

The optical film maybe formed so that at least one linear polarizing element to be disposed for the liquid-crystal display panel or the like is bonded to and laminated on the surface of the transparent film in which the light exit means are not provided. FIGS. 3A and 3B show examples of the optical film. The optical film 2 of the type in which the linear polarizing element 21 is bonded and laminated in advance is favorable for stabilization of quality, improvement in production efficiency of the liquid-crystal display device, and so on.

A suitable material can be used for the linear polarizing element without any specific limitation. A specific example of the material preferably used for the linear polarizing element is a material with a high degree of polarization such as an absorption type polarizing film obtained by orienting a hydrophilic polymer film such as a polyvinyl alcohol film, a partially formalized polyvinyl alcohol film or a partially saponified ethylene-vinyl acetate copolymer film while making the hydrophilic polymer film adsorb a dichromatic material such as iodine or dichromatic dye.

The linear polarizing element used may be formed so that transparent protective layers 22 and 23 according to the present invention are provided on one or both of opposite surfaces of the linear polarizing element as shown in FIG. 3A. A material which is excellent in transparency, mechanical strength, thermal stability, moisture sealability, or the like, and which has a refractive index in accordance with the aforementioned transparent film can be preferably used for forming each of the transparent protective layers.

Hence, as shown in FIG. 3B, the optical film 1 may be provided so as to serve also as a transparent protective layer for the linear polarizing element 21. In this case, the liquid-crystal display device or the like can be reduced in thickness and weight. In the optical film 2 of the type in which the linear polarizing element 21 is bonded and laminated in advance, a transparent adhesive means 24 to be bonded to another member may be provided on the side of the laminate in which the transparent film 1 is not provided, that is, on the side where the linear polarizing element or the like is attached in accordance with necessity as shown in each of FIGS. 3A and 3B. The adhesive means can be provided in accordance with the case of the transparent film.

Figure 5:
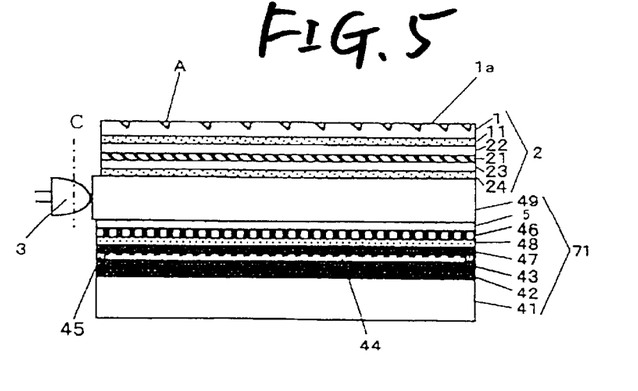
FIG. 5 is an explanatory side view of another liquid-crystal display device.
Figure 6:
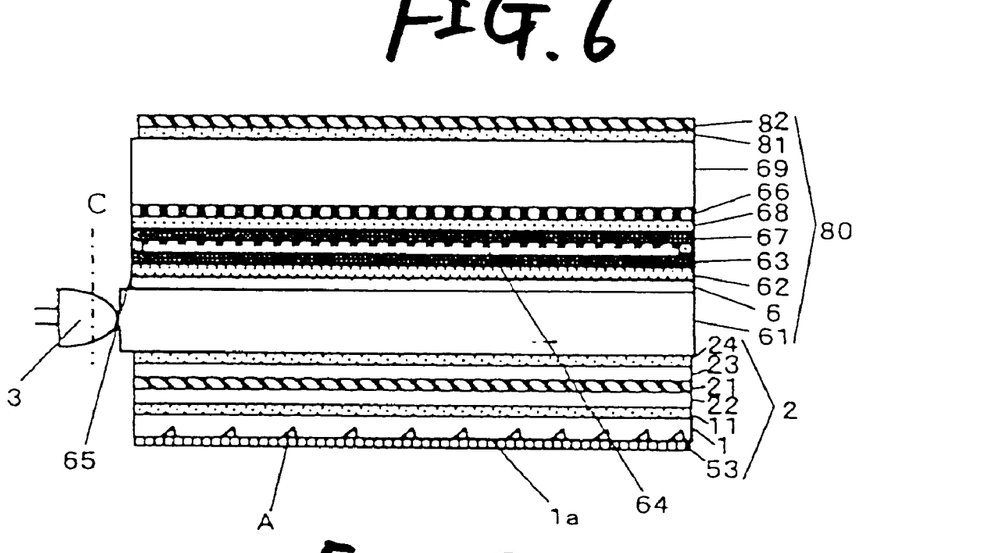
FIG. 6 is an explanatory side view of a further liquid-crystal display device.

In the optical film according to the present invention, the optical path of the radiant light incident on the side surface from the point light source or the optical path of the transmitted light of the incident light is changed, through the light exit means (optical path changing slopes) in the pit-like arrangement, into a direction (normal line direction) favorable for visual recognition and excellent in perpendicularity, so that the light is made to exit with good light-utilizing efficiency. Moreover, the optical film can exhibit good permeability to external light. Hence, the optical film can be used to form various devices such as an external light-illumination double mode reflective or transmissible liquid-crystal display device which is bright, which is easy to view, and which is thin in thickness and light in weight. FIGS. 4 to 6 show examples of the liquid-crystal display device. FIGS. 4 and 5 show examples of the external light-illumination double mode reflective liquid-crystal display device. FIG. 6 shows an example of the external light-illumination double mode transmissible liquid-crystal display device. The reference numerals 70, 71 and 80 designate liquid-crystal display panels; 41, 49, 61 and 69, panel substrates; 44 and 64, liquid-crystal layers; and 42 and 53, reflection layers.

As shown in FIGS. 4 and 5 (FIG. 6), the liquid-crystal display device can be formed by arranging the optical film 1 (2) on one side of each of the liquid-crystal display panels 70 and 71 (the liquid-crystal display panel 80) so that the side of the optical film 1 (2) where the light exit means A are formed is located outward. In this case, an illumination mechanism can be formed by arranging one or two or more point light sources 3 on a side surface or surfaces of the liquid-crystal display panel, particularly on a side surface or surfaces of the panel substrate 49 (61) on the side in which the optical film 1 (2) is disposed, as shown in each of FIGS. 4 and 5 (FIG. 6). Further, the corner part of the liquid-crystal display panel is removed, and the illumination mechanism may be disposed at the removed corner part.

When the illumination mechanism is formed, from the point of view to utilize incident light radiated from the point light source efficiently to thereby achieve bright display, it is preferable that the point light source is disposed on the side surface of the liquid-crystal display panel and on a perpendicular line containing the virtual center C of the light exit means A arranged like pits in the optical film, as shown in each of FIGS. 2A and 2B. For such arrangement of the point light source made in accordance with the virtual center C, a suitable measure can be taken such as a system in which the side of the panel substrate 49 (61) on which the point light source 3 is disposed is protruded in accordance with whether the virtual center C of the light exit means A is located on or outside the layer thickness surface 1c of the optical film as shown in FIG. 2A or 2B.

As the point light source, a suitable material such as a light-emitting diode which can be substantially regarded as a point light source can be used and can be driven through a suitable electric source. Incidentally, when visual recognition is made in an external light mode, the point light source need not be switched on. Hence, the point light source is provided so as to be able to be switched on/off. One point light source or two or more point light sources can be disposed on one side surface or two or more side surfaces of the liquid-crystal display panel, particularly in one place or two or more places in accordance with the virtual center of the light exit means in the optical film.

Generally, the liquid-crystal display device is formed by assembling a liquid-crystal display panel functioning as a liquid-crystal shutter, a driver attached to the liquid-crystal display panel, and a front light or backlight and by suitably assembling constituent parts such as a polarizer, a reflection layer, a compensating phase retarder, or the like, as occasion demands. In the present invention, no particular limitation is placed on the liquid-crystal display device except that the aforementioned optical film and the point light source are used for forming the illumination mechanism. As shown in FIGS. 4 to 6, the liquid-crystal display device can be formed in accordance with the background-art display device using a front light or a backlight.

Hence, the liquid-crystal display panel is not particularly limited. As shown in FIGS. 4 to 6, there can be used a suitable reflective or transmissible liquid-crystal display panel in which liquid crystal 44 or 64 is enclosed between panel substrates by a sealing material 45 or 65 so that display light can be obtained through optical control of the liquid crystal and a polarizer or the like which is provided as occasion demands.

Incidentally, specific examples of the liquid-crystal display panel as described above are: a twisted or non-twisted liquid-crystal display panel such as a TN liquid-crystal display panel, an STN liquid-crystal display panel, an IPS liquid-crystal display panel, an HAN liquid-crystal display panel, an OCB liquid-crystal display panel, or a VA liquid-crystal display panel; a guest-host or ferroelectric liquid-crystal display panel; a light-diffusing-type liquid-crystal display panel such as an internal diffusion one; and so on. A system for driving the liquid crystal may be also a suitable one, such as an active matrix system, a passive matrix system, or the like. The liquid crystal is generally driven through the electrode 42 which is provided inside the panel substrate so as to serve also as a reflection layer and the transparent electrodes 48 as shown in FIGS. 4 and 5, or the transparent electrodes 62 and 68 as shown in FIG. 6.

The panel substrate may be made of a suitable material such as glass, resin or the like. Especially, the transparent substrate is preferably made of an optically isotropic material from the point of view of display quality or the like. In addition, from the point of view to improve luminance or display quality or the like, a transparent substrate superior in colorlessness and transparency is preferred, for example, a non-alkali glass plate is preferred over a blue glass plate. Further, a resin substrate is preferred from the point of view of lightweight properties or the like. In a passive driving type TN or STN panel, a resin having a refractive index in a range of from about 1.48 to about 1.51 may be used as a panel substrate. In this case, when an optical film made of an adhesive means and a transparent film each having a refractive index of not lower than 1.49 is used, total reflection in the interface can be prevented so that reflection loss of the transmitted light can be reduced.

On the other hand, the above-mentioned non-alkali glass plate is often used as an active matrix type TFT or TFD panel substrate or the like and the panel substrate is required to be provide with a semiconductor film. In this case, when an optical film made of an adhesive means and a transparent film each having a refractive index of not lower than 1.50 is used, the angle for the transmitted light to generate total reflection can be reduced so that reflection loss of transmitted light can be reduced. When an optical film made of an adhesive means and a transparent film each having a refractive index of not lower than 1.51 is used, total reflection of the transmitted light in the interface can be prevented so that reflection loss of transmitted light can be reduced.

Incidentally, in the case where the substrate panel is made of a resin substrate, for example, an epoxy resin substrate, which has a refractive index of about 1.51, an optical film according to the aforementioned case of the non-alkali glass plate can be used preferably. The thickness of the panel substrate is not limited specially, but may be determined suitably in accordance with the intensity of enclosure of the liquid crystal or the like. Generally, from the point of view of the balance between the light transmission efficiency and the thin and lightweight properties, the thickness is set to be in a range of from 10 μm to 5 mm, especially in a range of from 50 μm to 2 mm, more especially in a range of from 100 μm to 1 mm.

The arrangement of the reflection layer 42 is essential to the reflective liquid-crystal display device. The position of arrangement of the reflection layer 42 is optional. For example, the reflection layer 42 may be provided inside the liquid-crystal display panel 70 or 71 as shown in FIG. 4 or or may be provided outside the liquid-crystal display panel. The reflection layer can be formed as a suitable reflection layer according to the background art. Examples of the reflection layer are: a coating layer containing powder of a high-reflectance metal such as aluminum, silver, gold, copper or chromium in a binder resin; a layer of a metal thin film deposited by an evaporation system, or the like; a reflection sheet having the coating or deposited layer supported by a substrate; a sheet of metal foil; a transparent electrically conductive film; a dielectric multilayer film; and so on. When a transmissible liquid-crystal display device is provided as an external light-illumination double mode transmissible liquid-crystal display device, the reflection layer 53 disposed on the outer side of the optical film 2 as shown in FIG. 6 may be made of a suitable material according to the above description.

Incidentally, in the above description, when the reflection layer is disposed outside the liquid-crystal display panel as shown in FIG. 6, in order to make liquid-crystal display possible, the panel substrates 61 and 69 (41 and 49) and the electrodes 62 and 68 (42 and 48) need to be formed as transparent substrates and as transparent electrodes respectively. On the other hand, when the electrode 42 serving also as a reflection layer is disposed inside the liquid-crystal display panel as shown in each of FIGS. 4 and 5, in order to make liquid-crystal display possible, the visual side panel substrate 49 and the electrode 48 are required to be formed as a transparent substrate and as a transparent electrode respectively while the back side panel substrate 41 as well as the reflection layer 42 is not required to be transparent but may be made of an opaque body.

When the liquid-crystal display panel is formed, alignment films 43 and 47 (63 and 67) such as films rubbed for aligning liquid crystal, a color filter 46 (66) for realizing color display, a low-refractive-index layer 5 (6), a linear polarizing element or polarizer (82), and so on, as shown in FIGS. 4 and 5 (FIG. 6), may be provided as occasion demands. Generally, the alignment films are generally disposed so as to be adjacent to the liquid-crystal layer, and the color film is disposed between a panel substrate and an electrode. The polarizer or the like is provided for controlling display light through linear polarization. As shown in FIG. 5 or 6, the polarizer is disposed in a suitable position on one or each of the visual and back sides of the liquid-crystal panel.

Incidentally, the polarizer can be used in accordance with the display type based on liquid crystal of the liquid-crystal display panel as occasion demands. For example, the display type based on guest-host liquid crystal, which requires no polarizer can be formed by a liquid-crystal display device in which such a polarizer is omitted as shown in FIG. 4. As the polarizer, it is possible to use a suitable one according to the aforementioned linear polarizing element. From the point of view to obtain display with a good contrast ratio by using incidence of high-grade linearly polarized light, or the like, a polarizer with a high degree of polarization may be used preferably.

Further, the aforementioned low-refractive-index layer is provided so that incident light on the side surface from the point light source is interfacially reflected so that the reflected light is transmitted efficiently backward in a direction of departing from the point light source. As a result, the light is incident efficiently on the optical path changing slopes A1 of the optical film 1 located in the back portion, so that uniformity of brightness is improved on the whole area of the panel display surface. The low-refractive-index layer can be formed as a transparent layer made of a suitable low-refractive-index inorganic or organic material such as a fluorine compound. From the point of view to improve brightness of panel display, it is preferable that the low-refractive-index layer is disposed on the inner side of the panel substrate 49 or 62 provided with the point light source 3 arranged thereon as shown in FIGS. 4 to 6, that is, on the side of the panel substrate opposite to the optical film attachment side. From the point of view to improve brightness of panel display, it is also preferable that the refractive index of the low-refractive-index layer is lower by 0.01 or higher, especially by a value in a range of from 0.02 to 0.15, more especially by a value in a range of from 0.05 to 0.10, than that of the panel substrate.

For the formation of the liquid-crystal display device, one suitable optical layer or two or more suitable optical layers such as a phase retarder, a light-diffusing layer, or the like, besides the non-glare layer or the like, may be added to the liquid-crystal display panel as occasion demands. The phase retarder is provided for compensating for retardation caused by the birefringence of liquid crystal to thereby attain improvement of display quality, and so on. The light-diffusing layer is provided for diffusing display light so as to enlarge the display range, for leveling bright-line-like light emission through the optical film so as to make luminance uniform, for diffusing light transmitted in the inside of the liquid-crystal display panel so as to increase the quantity of light incident on the optical film, etc. Incidentally, the optical layer to be added may be integrally laminated on the optical film through an adhesive layer or the like in accordance with necessity so that the thus formed optical layer can be applied to the liquid-crystal display panel.

The compensating phase retarder is generally disposed between a visual side or/and back side polarizer and a panel substrate, or the like. A suitable plate in accordance with the wave range may be used as the compensating phase retarder. The phase retarder may be formed as one retardation layer or as a superposed layer of two or more retardation layers. The phase retarder may be formed by use of a suitable plate, such as: a birefringent film obtained in such a manner that a film composed of any suitable transparent polymer is oriented by a suitable system such as a uniaxal or biaxial orientation system, or the like; an alignment film of a suitable nematic or discotic liquid-crystal polymer or the like; such an alignment film in which the alignment layer is supported by a transparent substrate; or the like. Alternatively, the phase retarder may have a thicknesswise refractive index controlled under the function of heat-shrinking force of a heat-shrinkable film.

The light-diffusing layer may be provided by a suitable system using a coating layer, a diffusing sheet, or the like, having a surface fine prismatic structure in accordance with the aforementioned non-glare layer. The light-diffusing layer may be provided with an adhesive layer mixed with transparent particles so that the light-diffusing layer serves also as an adhesive means. Hence, reduction in thickness can be attained.

Incidentally, in the reflective liquid-crystal display device shown in FIG. 4 or 5, visual recognition both in an external light mode and in an illumination mode is made as follows. In an illumination mode in which the point light source 3 is switched on, light made to exit from the rear surface 1b of the optical film 1 is reflected by the reflection layer 42 via the liquid-crystal display panel 70 or 71. Then, the light inversely passes through the inside of the liquid-crystal display panel and reaches the optical film, so that display light transmitted through the other portion of the optical film than the light exit means A is visually recognized. On the other hand, in an external light mode in which the light source is switched off, light incident on the other portion than the light exit means in the light exit means-forming surface 1a of the optical film 1 inversely passes through the-inside of the liquid-crystal display panel through the reflection layer 42 in the aforementioned manner and reaches the optical film, so that display light transmitted through the other portion than the light exit means is visual recognized.

On the other hand, in the transmissible liquid-crystal display device shown in FIG. 6, visual recognition both in an external light mode and in an illumination mode is made as follows. In an illumination mode in which the point light source 3 is switched on, light mode to exit from the rear surface (upper side) 1b of the optical film 1 enters the liquid-crystal display panel 80, so that display light transmitted through the polarizer 82 is visually recognized. In an external light mode in which the light source is switched off, external light incident on a surface of the polarizer 82 is transmitted through the liquid-crystal display panel 80 and reaches the optical film 1. Hence, light incident on the other portion than the light exit means in the light exit means-forming surface 1a of the optical film 1 is inverted by the reflection layer 53. The light inversely passes through the inside of the liquid-crystal display panel, so that display light transmitted through the polarizer 82 is visually recognized.

In the present invention, parts for forming the liquid-crystal display panel constituting the liquid-crystal display device may be wholly or partially integrally laminated/fixed onto one another or may be disposed to be separable easily from one another. From the point of view to suppress of interface reflection to thereby prevent lowering of contrast, or the like, it is preferable that such parts are fixed to one another. At least the optical film and the liquid-crystal display panel are preferably bonded and are fixed to each other. A suitable transparent adhesive agent such as a tackiness agent can be used for the fixing process. The transparent adhesive layer may contain transparent particles so as to be able to be provided as an adhesive layer exhibiting a diffusion function.

The aforementioned constituent parts, especially those on the visual side, may be made to have ultraviolet absorptive power, for example, by a treatment system with an ultraviolet absorbent such as a salicylate compound, a benzophenol compound, a benzotriazole compound, a cyanoacrylate compound or a nickel complex salt compound.

Reference Example 1

A clean glass plate spin-coated with polyimide varnish was pre-baked at 100° C. for 30 minutes and then sintered at 350° C. for 4 hours to thereby form a polyimide coating film having a thickness of 10 $\mu$m. A 0.1 $\mu$m-thick chromium film and a 0.5 $\mu$m-thick copper film were successively provided on the polyimide coating film by a sputtering system. A 5 $\mu$m-thick positive resist was applied onto a surface of the copper film by spin coating. Next, a predetermined chromium mask was disposed tightly on the resist layer. After exposure to ultraviolet rays, the resist was developed. Then, the copper film and the chromium film were etched. Thus, a substrate was obtained. The substrate was configured so that openings were formed radially in the copper layer on the glass plate on the basis of use of the chromium mask in which the openings each having a size of 60 $\mu$m×10 $\mu$m were formed radially toward the direction of the length of the substrate with a position far by 8 mm from the dot-forming end portion as its center and the openings were disposed so irregularly that the arrangement density of the openings increased as the openings were located farther from the center.

Then, the substrate was disposed on a rotary stage so that the arrangement center of the openings of the substrate was made coincident with the center of the rotary stage. The rotary stage was set at an angle of 45 degrees with respect to a laser beam. While the openings shaped like a fan were rotated and laser light was scanned by a large number of times, the substrate was irradiated with an excimer laser beam so that the polyimide coating film was partially removed by ablation. After the copper film and the chromium film were further removed by etching, a silver film was applied onto the-substrate by vacuum evaporation, and nickel was electrocast onto the silver film. Then, the substrate was cut into a predetermined shape. Thus, a mold A was obtained by removing the substrate. Incidentally, the silver evaporation was performed in the condition that an evaporation source was disposed in a position of 650 nm just under the substrate.

By the mold A, light exit means constituted by convex portions, which were arranged intermittently like pits so that a virtual center was formed outside the center portion of the layer thickness surface of the film, could be formed into a state in which the area occupied by the convex portions was not larger than 1/10 as large as the whole area of the surface in which the light exit means were formed. Each convex portion was shaped substantially like a scalene triangle in section which had a length of about 60 $\mu$m and a height of about 5 $\mu$m and which was constituted by a combination of an optical path changing slope inclined to the film surface at an inclination angle of about 43 degrees and an elevational face inclined to the film surface at an inclination angle of about 80 degrees.

Reference Example 2

A mold B was obtained in the same manner as in Reference Example 1 except that light exit means were formed into a state in which the area occupied by the convex portions was not larger than 1/15 as large as the whole area of the surface in which the light exit means were formed.

Reference Example 3

One surface of a brass plate with a predetermined size was cut continuously in parallel with the direction of the length of the plate by a diamond bite to thereby obtain a mold C having a plurality of light exit means. The light exit means were formed into prismatic structures each constituted by a combination of a steep slope and a gentle slope. The steep slope had an inclination angle of 42 degrees and a projected width of 20 μm, while the gentle slope had a projected width of 190 μm. The prismatic structures were arranged adjacently at intervals of a pitch of 210 μm. The area occupied by the steep slopes was 1/10.5.

Reference Example 4

Figure 7:
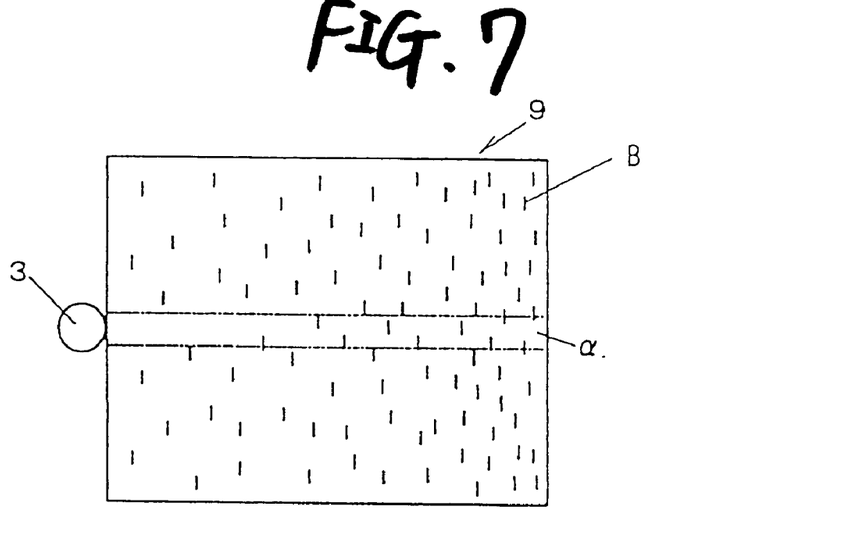
FIG. 7 is an explanatory plan view of a light emission state in a comparative example.

A mold D was obtained in the same manner as in Reference Example 1 except that light exit means were not arranged like pits but light exit means B were formed in parallel with one to side of the glass plate as shown in FIG. 7.

Reference Example 5

Magnesium fluoride was vacuum-deposited on one surface of a clean-surface glass plate with a width of 45 mm, a length of 30 mm, a thickness of 1.3 mm and a refractive index of 1.51 to thereby form a low-refractive-index layer 600 nm thick. A transparent electrically conductive film made of an indium-tin oxide (ITO) thin film and having a sheet resistance of 11Ω was formed on the low-refractive-index layer by a sputtering system. The transparent electrically conductive film was etched at intervals of a pitch of 240 μm with a line width of 200 μm and a space of 200 μm so as to be patterned into electrodes.

Then, polyimide was applied thereon by spin coating and cured at 350° C. The cured thin film was rubbed at an angle of 45 degrees with respect to the glass plate to thereby form an alignment film. Thus, a first substrate was obtained. A second substrate was obtained in the same manner as described above except that the glass plate was replaced by a glass plate having a width of 40 mm and a length of 35 mm.

Then, spacer particles were arranged on the alignment film of the first substrate. Then, the second substrate was disposed oppositely so that the alignment film crossed at an angle of 90 degrees and so that the size difference formed a protrusive portion. Two short sides of the second substrate were sealed with a curable layer of an epoxy resin and enclosed in a nematic liquid-crystal layer containing a chiral agent. Liquid crystal was injected through the gap by capillarity. After the remaining two sides were sealed in the same manner as described above, the liquid crystal was heated to 130 degrees so as to become isotropic. Then, the liquid crystal was cooled slowly. Thus, a liquid-crystal display panel 1 was obtained. Incidentally, for the injection of liquid crystal, the protrusive portion of the substrate was masked so that the electrode pattern of the substrate was not contaminated with the epoxy resin.

Reference Example 6

A liquid-crystal display panel 2 was obtained in the same manner as in Reference Example 5 except that liquid crystal containing a dichromatic dye was injected onto an electrode pattern without provision of any alignment film.

EXAMPLE 1

An ultraviolet-curable acrylic resin was applied onto a polyester film 50 μm thick so that the acrylic resin formed a film 75 μm thick. After the film was made to adhere closely onto the mold A obtained in Reference Example 1 by a rubber roller so that air bubbles were extruded, the acrylic resin was irradiated with 300 mJ/cm$^2$ of ultraviolet rays by a metal halide lamp so as to be cured. Then, the cured acrylic resin was peeled off from the mold. Further, the polyester film was peeled off, so that there was obtained a film having a refractive index of 1.512 and having light exit means onto which the negative shape of the mold A was transferred well. An adhesive layer with a refractive index of 1.518 was attached to the surface of the film in which no light exit means were provided. The film was punched into a size with a long side of 38 mm and a short side of 28 mm so that the virtual center of the light exit means was located in a position 6 mm outward in the center portion of a short side of the film. Thus, an optical film was obtained.

EXAMPLE 2

An optical film was obtained in the same manner as in Example 1 except that the mold B obtained in Reference Example 2 was used.

Comparative Example 1

An optical film was obtained in the same manner as in Example 1 except that the mold C obtained in Reference Example 3 was used.

Comparative Example 2

An optical film 9 (FIG. 7) was obtained in the same manner as in Example 1 except that the mold D obtained in Reference Example 4 was used.

EXAMPLE 3

The optical film obtained in Example 1 was bonded, through its adhesive layer, to a polarizer which was available on the market and which was made of a polarizing film having transparent protective layers on opposite sides. An adhesive layer with a refractive index of 1.518 was attached to the outer surface of the polarizer. Thus, a linear polarizing element attachment type optical film was obtained.

EXAMPLE 4

A linear polarizing element attachment type optical film was obtained in the same manner as in Example 3 except that the optical film obtained in Example 2 was used.

Comparative Example 3

A linear polarizing element attachment type optical film was obtained in the same manner as in Example 3 except that the optical film obtained in Comparative Example 1 was used.

Comparative Example 4

A linear polarizing element attachment type optical film was obtained in the same manner as in Example 3 except that the-optical film obtained in Comparative Example 2 was used.

EXAMPLE 5

The optical film obtained in Example 1 was bonded, through its adhesive layer, to the liquid-crystal display panel 2 obtained in Reference Example 6 so that the virtual center of the light exit means was located in the short side center portion of the first substrate in the liquid-crystal display panel 2. A reflection sheet made of a polyester film was bonded to the outer surface of the second substrate by a light-diffusing type adhesive layer containing transparent fine particles so that a reflection layer made of a silver vapor-deposited film in the reflection sheet was located inward. Then, an on/off switchable LED lamp was set on a side surface of the first substrate and on a perpendicular line drawn from the virtual center of the light exit means. Thus, a normally white external light-illumination double mode reflective liquid-crystal display device was obtained.

EXAMPLE 6

A liquid-crystal display device was obtained in the same manner as in Example 5 except that the optical film obtained in Example 2 was used.

Comparative Example 5

A liquid-crystal display device was obtained in the same manner as in Example 5 except that the optical film obtained in Comparative Example 1 was used.

Comparative Example 6

A liquid-crystal display device was obtained in the same manner as in Example 5 except that the optical film obtained in Comparative Example 2 was used.

EXAMPLE 7

The optical film obtained in Example 3 was bonded, through its adhesive layer, to the liquid-crystal display panel 1 obtained in Reference Example 5 so that the absorption axis of the polarizer was parallel with the rubbing direction of the alignment film and so that the virtual center of the light exit means was located in the short side center portion of the first substrate in the liquid-crystal display panel 1. A polarizer was bonded to the outer surface of the second substrate through an adhesive layer so as to have a crossed-Nicol relation with the first-mentioned polarizer. A reflection sheet made of a polyester film was bonded to the outer surface of the polarizer by a light-diffusing type adhesive layer containing transparent fine particles so that a reflection layer made of a silver vapor-deposited film in the reflection sheet was located inward. Then, an on/off switchable LED lamp was set on a side surface of the first substrate and on a perpendicular line drawn from the virtual center of the light exit means. Thus, a normally white external light-illumination double mode reflective liquid-crystal display device was obtained.

EXAMPLE 8

A liquid-crystal display device was obtained in the same manner as in Example 7 except that the optical film obtained in Example 4 was used.

Comparative Example 7

A liquid-crystal display device was obtained in the same manner as in Example 7 except that the optical film obtained in Comparative Example 3 was used.

Comparative Example 8

A liquid-crystal display device was obtained in the same manner as in Example 7 except that the optical film obtained in Comparative Example 4 was used.

Comparative Example 9

A liquid-crystal display device was obtained in the same manner as in Example 7 except that the optical film obtained in Example 1 instead of the optical film obtained in Example 3 was bonded to an acrylic plate 45 mm wide, 30 mm long and 1.3 mm thick to form a light pipe, except that a polarizer was formed on the light pipe, and except that an LED was set for the light pipe.

EXAMPLE 9

A liquid-crystal display device was obtained in the same manner as in Example 7 except that the display device was provided to be of an external light-illumination double mode transmissible liquid-crystal display device which uses the reflection sheet disposed outside the optical film of the first substrate and the second substrate disposed on the visual side.

Evaluation Test

Display characteristic was observed while the LED was switched on in the condition that no voltage was applied to the liquid-crystal panel of the liquid-crystal display device obtained in each of Examples 5 to 8 and Comparative Example 5 to 9 and in the condition that a voltage was applied so as to be striped laterally alternately. As a result, in all Examples 1 to 9, light was emitted approximately uniformly from the display screen, so that bright display was obtained without generating any moire. On the contrary, in Comparative Examples 6 and 8, light was emitted linearly so as to be perpendicular to the panel in accordance with the position of arrangement of the LED as represented by the zone α in FIG. 7 but light was little emitted from the other portion, so that very uneven light emission with a large difference between brightness and darkness was obtained. In Comparative Examples 5 and 7, light was emitted linearly, so that the light emission line was conspicuous. Hence, display in Comparative Examples 5 and 7 was hard to view compared with Examples 1 to 9. When voltages were applied alternately, such light emission lines interfered with pixels. Hence, display was very hard to view.

On the other hand, a display image was observed while a voltage was applied to the liquid-crystal display panel in an external light mode in the condition that the LED was switched off in a bright room. As a result, in Examples 1 to 9, good display was obtained. On the contrary, in Comparative Examples 1 to 9, especially in Comparative Examples 6 and 8, moire was produced so that display was hard to view. In Comparative Example 9, bright display was obtained both in an external light mode and in an illumination mode but display was made whitish by surface reflection on the light pipe and the liquid-crystal display panel so that contrast was low. Moreover, because the light pipe was used, the thickness of the display device was thickened by about 1.5 mm compared with Examples 1 to 9 and the other Comparative Examples 1 to 8, and the weight of the display device was increased unfavorably to reduction in thickness and weight.

On the other hand, in Example 9, bright and good display could be obtained both in an external light mode and in an illumination mode. It is obvious from the above description that when the optical film according to the present invention is bonded to a liquid-crystal display panel and a point light source is disposed on a side surface, there can be obtained a external light-illumination double mode transmissible liquid-crystal display device using a backlight or an external light-illumination double mode reflective liquid-crystal display device using a front light, which is bright, excellent in uniformity of light emission, free from moire and good in display quality.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical film comprising:

a transparent film with a refractive index of not lower than 1.49, said transparent film including light exit means, which are constituted by concave or convex portions arranged in one surface of said transparent film so as to face a virtual center located on or outside a side surface of said transparent film, which serves as a light source arrangement side each of said concave or convex portions having a length of not larger than 200 µm and a depth or height of not larger than 50 µm, each of said light exit means having an optical path changing slope inclined to said one surface of said transparent film at an inclination angle in a range of from 35 to 48 degrees, and an elevational face inclined to said one surface at an inclination angle of not lower than 50 degrees.

2. An optical film according to claim 1, further comprising a transparent adhesive means, which has a refractive index of not lower than 1.49, and which is provided on another surface of said transparent film in which said light exit means are not provided.

3. An optical film according to claim 2, wherein said adhesive means is constituted by an adhesive layer.

4. An optical film according to claim 1, wherein a projected area of said light exit means in said one surface of said transparent film is not larger than 1/8 of a whole area of said one surface.

5. Art optical film according to claim 1, wherein said inclination angle of each of said optical path changing slopes with respect to said one surface is in a range of from 38 to 45 degrees.

6. An optical film according to claim 1, wherein said light exit means are constituted by said concave portions each shaped substantially like a scalene triangle in section.

7. An optical film according to claim 1, wherein said concave or convex portions are irregularly arranged.

8. An optical film according to claim 1, wherein said concave or convex portions are arranged denser as said concave or convex portions are located farther from said virtual center.

9. An optical film according to claim 1, further comprising at least one linear polarizing element bonded and laminated on another surface of said transparent film in which said light exit means are not provided.

10. An optical film according to claim 9, further comprising a transparent adhesive means provided on a side of said linear polarizing element opposite to side that is bonded and laminated on said another surface of said transparent film.

11. An optical film according to claim 10, wherein said adhesive means has a refractive index of not lower than 1.49.

12. A liquid-crystal display device comprising: a liquid-crystal display panel; and an optical film defined in claim 1, said optical film being disposed on a surface of said liquid-crystal display panel so that a surface of said optical film in which said light exit means are provided is located outward.

13. A liquid-crystal display device according to claim 12, further comprising a point light source disposed on one of side surfaces of said liquid-crystal display panel and on a perpendicular line containing said virtual center of said light exit means.

14. A liquid-crystal display device according to claim 13, wherein said point light is constituted by a light-emitting diode.

* * * * *